(12) United States Patent
Son et al.

(10) Patent No.: US 10,797,339 B2
(45) Date of Patent: Oct. 6, 2020

(54) ELECTRODE ASSEMBLY FOR SECONDARY BATTERY AND METHOD FOR MANUFACTURING THE SAME

(71) Applicant: LG Chem, Ltd., Seoul (KR)

(72) Inventors: Jin Young Son, Daejeon (KR); Hyun Won Lee, Daejeon (KR); Do Hwa Jung, Daejeon (KR); Ye Lin Kim, Daejeon (KR)

(73) Assignee: LG Chem, Ltd. (KR)

( * ) Notice: Subject to any disclaimer, the term of this patent is extended or adjusted under 35 U.S.C. 154(b) by 31 days.

(21) Appl. No.: 15/548,599

(22) PCT Filed: Jun. 16, 2016

(86) PCT No.: PCT/KR2016/006418
§ 371 (c)(1),
(2) Date: Aug. 3, 2017

(87) PCT Pub. No.: WO2016/208909
PCT Pub. Date: Dec. 29, 2016

(65) Prior Publication Data

US 2018/0241071 A1    Aug. 23, 2018

(30) Foreign Application Priority Data

Jun. 23, 2015 (KR) .................. 10-2015-0089266

(51) Int. Cl.
*H01M 10/04* (2006.01)
*H01M 2/16* (2006.01)
(Continued)

(52) U.S. Cl.
CPC ..... *H01M 10/0431* (2013.01); *H01M 2/1673* (2013.01); *H01M 4/0404* (2013.01); *H01M 10/0585* (2013.01); *H01M 10/0583* (2013.01)

(58) Field of Classification Search
CPC .......... H01M 10/0431; H01M 2/1673; H01M 4/0404
See application file for complete search history.

(56) References Cited

U.S. PATENT DOCUMENTS

2002/0160258 A1  10/2002  Lee et al.
2003/0013012 A1   1/2003  Ahn et al.
(Continued)

FOREIGN PATENT DOCUMENTS

CN      1363123 A    8/2002
CN    101485033 A    7/2009
(Continued)

OTHER PUBLICATIONS

Search report from International Application No. PCT/KR2016/006418, dated Sep. 22, 2016.
(Continued)

*Primary Examiner* — Ula C Ruddock
*Assistant Examiner* — Frank A Chernow
(74) *Attorney, Agent, or Firm* — Lerner, David, Littenberg, Krumholz & Mentlik, LLP

(57) ABSTRACT

The present invention relates to an electrode assembly for a secondary battery. The electrode assembly for the secondary battery comprises a radical unit comprising first and second electrode sheets each of which is folded so that both ends thereof overlap each other; and a first separator folded several times and having an upper folded portion into which the first electrode sheet is coupled to be fitted and a lower folded portion into which the second electrode sheet is coupled to be fitted, wherein, in the radical unit, the folded portions of the first and second electrode sheets are cut to form two first electrodes and two second electrodes, which are completely separated from each other, and the first electrode, the first separator, the second electrode, the first (Continued)

separator, the first electrode, the first separator, and the second electrode successively stacked.

8 Claims, 14 Drawing Sheets

(51) Int. Cl.
    *H01M 10/0585*      (2010.01)
    *H01M 4/04*      (2006.01)
    *H01M 10/0583*      (2010.01)

(56) References Cited

U.S. PATENT DOCUMENTS

| | | |
|---|---|---|
| 2010/0015529 A1 | 1/2010 | Kim et al. |
| 2012/0225345 A1 | 9/2012 | Kim |
| 2014/0227583 A1 | 8/2014 | Do et al. |
| 2015/0180082 A1 | 6/2015 | Jung et al. |

FOREIGN PATENT DOCUMENTS

| | | |
|---|---|---|
| JP | 2001160393 A | 6/2001 |
| JP | 2002093404 A | 3/2002 |
| JP | 2003523061 A | 7/2003 |
| JP | 2013254629 A | 12/2013 |
| KR | 20010019700 A | 3/2001 |
| KR | 100958649 B1 | 5/2010 |
| KR | 20110112241 A | 10/2011 |
| KR | 20130089373 A | 8/2013 |
| KR | 20140066474 A | 6/2014 |
| KR | 20150049602 A | 5/2015 |
| WO | 2014126427 A1 | 8/2014 |

OTHER PUBLICATIONS

Chinese Search Report for Application No. CN201680011296.4 dated Aug. 14, 2019.

ELECTRODE ASSEMBLY FOR SECONDARY BATTERY AND METHOD FOR MANUFACTURING THE SAME

The present application is a national phase entry under 35 U.S.C. § 371 of International Application No. PCT/KR2016/006418, filed Jun. 16, 2016, which claims the benefit of the priority of Korean Patent Application No. 10-2015-0089266, filed on Jun. 23, 2015, all of which are incorporated herein by reference.

TECHNICAL FIELD

Cross-Reference to Related Application

The present application claims the benefit of the priority of Korean Patent Application No. 10-2015-0089266, filed on Jun. 23, 2015, which is hereby incorporated by reference in its entirety.

Technical Field

The present invention relates to an electrode assembly for a secondary battery and a method for manufacturing the same, and more particularly, to an electrode assembly, in which folded first and second electrodes are coupled to a folded separator to simplify a structure of the electrode assembly, and a method for manufacturing the same.

BACKGROUND ART

In general, secondary batteries refer to chargeable and dischargeable batteries, unlike primary batteries that are not chargeable. Such a secondary battery is being widely used in the high-tech electronic fields such as mobile phones, notebook computers, and camcorders.

DISCLOSURE OF THE INVENTION

Technical Problem

The secondary battery according to the related art comprises an electrode assembly comprising a positive electrode, a separator, and a negative electrode and a case in which an electrolyte is accommodated together with the electrode assembly.

In recent years, as the secondary batteries increase in use, it is required to increase productivity, and thus, a production line is expanded to improve productivity.

However, in the secondary battery according to the related art, an additional cost occurs due to the expansion of the production line, and also, there is a limitation in improving the productivity due to a problem in installation space.

The present invention has been made to solve the above-mentioned problem, and an object of the present invention is to provide an electrode assembly of which a manufacturing method is improved to improve productivity without expanding a separate production line and a method for manufacturing the same.

Technical Solution

To achieve the above-described objects, an electrode assembly for a secondary battery according to a first embodiment of the present invention comprises a radical unit comprising first and second electrode sheets each of which is folded so that both ends thereof overlap each other; and a first separator folded several times and having an upper folded portion into which the first electrode sheet is coupled to be fitted and a lower folded portion into which the second electrode sheet is coupled to be fitted, wherein, in the radical unit, the folded portions of the first and second electrode sheets are cut to form two first electrodes and two second electrodes, which are completely separated from each other, and the first electrode, the first separator, the second electrode, the first separator, the first electrode, the first separator, and the second electrode successively stacked.

An electrode assembly for a secondary battery according to a second embodiment of the present invention comprises a radical unit comprising first and second electrode sheets each of which is folded so that both ends thereof overlap each other; and a first separator folded several times and having an upper folded portion into which the first electrode sheet is coupled to be fitted and a lower folded portion into which the second electrode sheet is coupled to be fitted, wherein, in the radical unit, a portion of each of the folded portions of the first and second electrode sheets is cut to form two first electrodes and two second electrodes, of which the portions are connected to each other, and the first electrode, the first separator, the second electrode, the first separator, the first electrode, the first separator, and the second electrode are successively stacked.

Specific constituents of the electrode assembles for the secondary battery according to the first and second embodiments of the present invention will now be described.

The first electrode sheet may comprise a first electrode portion disposed on an unfolded portion and coated with a first electrode active material and a first non-coating portion which is disposed on the folded portion and on which the first electrode active material is not provided, and in the first electrode sheet, the first non-coating portion may be folded to be divided into two first electrode portions.

Each of the folded portions of the first non-coating portions may extend outward to be used as a first electrode tab.

A non-coating surface on which the first electrode active material is not provided may be disposed on a front end of the first electrode portion.

The second electrode sheet may comprise a second electrode portion disposed on an unfolded portion and coated with a second electrode active material and a second non-coating portion which is disposed on the folded portion and on which the second electrode active material is not provided, and in the second electrode sheet, the second non-coating portion may be folded to be divided into two second electrode portions.

Each of the folded portions of the second non-coating portions may extend outward to be used as a second electrode tab of the second electrode.

A non-coating surface on which the second electrode active material is not provided may be disposed on a front end of the second electrode portion.

The radical unit may be provided in plurality, and a second separator may be interposed between the plurality of radical units.

The second separator may have a size greater than that of the radical unit.

In the plurality of radical units stacked in multi-stages, the first or second electrode tabs may be disposed on the same side, and the first or second electrode tabs disposed on the same side may be welded to be fixed.

A method for the electrode assembles for the secondary battery comprises steps of: (a) applying first and second electrode active materials on both surfaces of both ends except for a non-coating portion disposed at a central portion to manufacture first and second electrode sheets; (b) folding the non-coating portion so that the first or second electrode active material applied to both the ends of the first or second electrode sheet manufactured in the step (a); (c) folding a first separator two times; (d) fitting the first electrode sheet into an upper folded portion of the first separator folded in the step (c) to couple the first electrode sheet to the first separator and fitting the second electrode sheet into a lower folded portion to couple the second electrode sheet to the first separator to assemble a radical unit that is an unfinished product; and (e) cutting the first and second non-coating portions of the radical unit that is the unfinished product to form first and second electrode tabs, and thereby to manufacture a radical unit that is a finished product, wherein, in the radical unit, a first electrode, a first separator, a second electrode, the first separator, the first electrode, the first separator, and the second electrode are successively stacked.

In the step (a), the first and second electrode active materials may be applied except for an additional non-coating portion disposed on both the ends together with the central portions of the first and second electrode sheets.

The first or second non-coating portion folded in the step (d) may be disposed on the outside without being coupled to the folded portion of the first separator.

In the step (e), the folded portion of the first or second non-coating portion may be completely cut in a width direction thereof to divide the folded portion into two first electrodes or two second electrodes, and the cut first or second non-coating portions may be used as first or second electrode tabs.

In the step, in the step (e), the folded portion of the first or second non-coating portion may be partially cut in a width direction thereof to divide the folded portion into two first electrodes or two second electrodes, which are connected to the first or second non-coating portions, and the cut first or second electrodes may be used as first or second electrode tabs of the first or second non-coating portions.

The method may further comprise a step (f) of stacking at least two radical units that are manufactured in the steps (e) with a second separator therebetween to assemble the electrode assembly.

The method may further comprise a step (g) of welding the first and second electrode tabs exposed in the same lateral direction of the electrode assembly that is assembled in the step (f) to complete the electrode assembly.

The first and second non-coating portions may be cut by using laser.

Advantageous Effects

The present invention has effects as follows.

First: the electrode assembly may be configured through the radical unit in which the folded first and second electrode portions are coupled to the first separator to simplify the structure of the electrode assembly, thereby improving the productivity of the electrode assembly.

Second: the folded first and second non-coating portions of the first and second electrode portions may be completely or partially cut to manufacturing the multi-layered electrode assembly.

Third: the folded first and second non-coating portions of the first and second electrode portions may be used as the electrode tabs to simplify the structure and reduce the cost because it is unnecessary to couple a separate electrode tab.

Fourth: the non-costing surface may be provided on each of the front ends of the first and second electrode portions to prevent the short-circuit from occurring between the electrodes.

MODE FOR CARRYING OUT THE INVENTION

Figure 1:
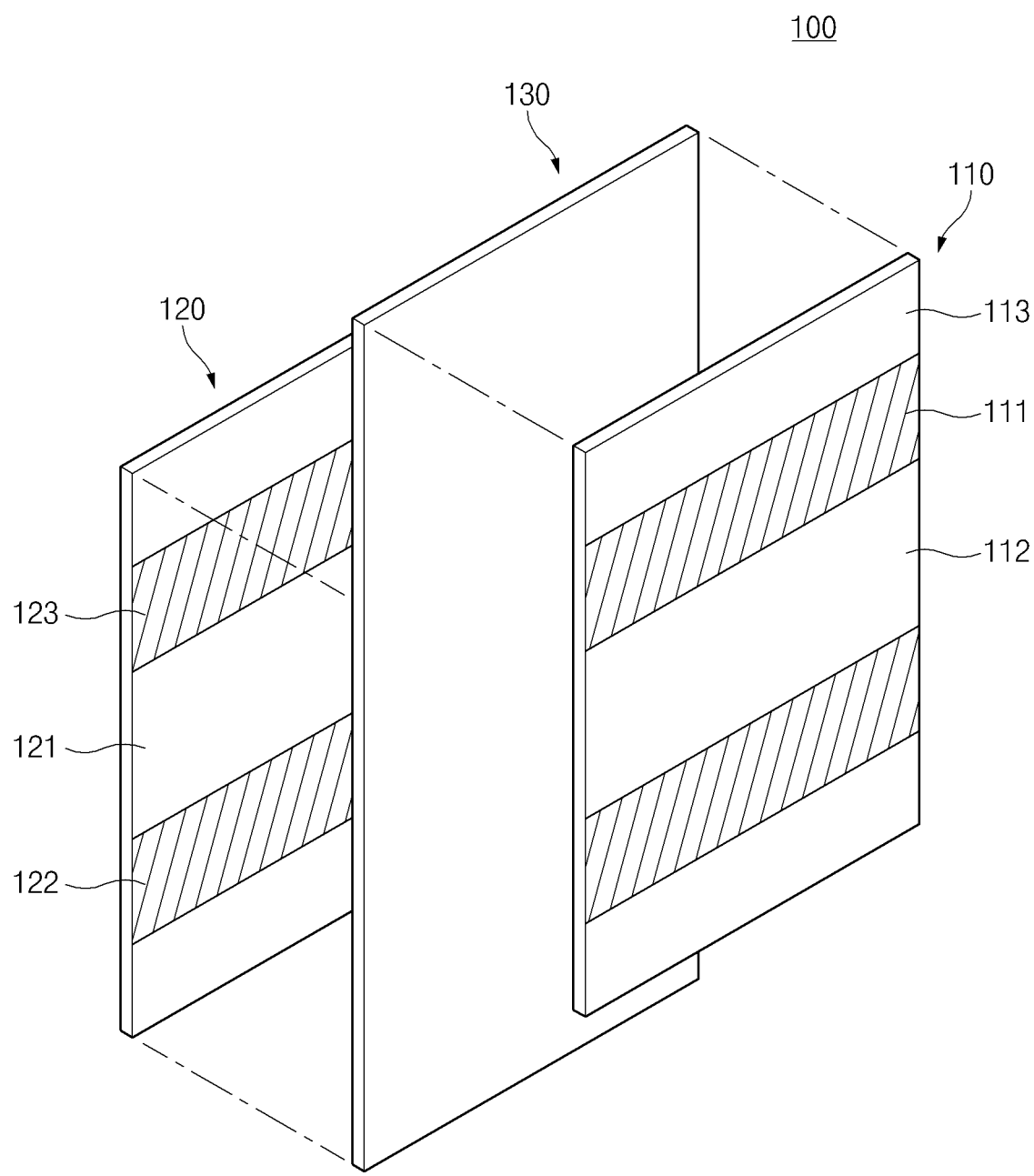
FIG. 1 is a perspective view of an unfolded radical unit according to a first embodiment of the present invention.

Hereinafter, embodiments of the present invention will be described in detail with reference to the accompanying drawings in such a manner that the technical idea of the present invention may easily be carried out by a person with ordinary skill in the art to which the invention pertains. The present invention may, however, be embodied in different forms and should not be construed as limited to the embodiments set forth herein. In the drawings, anything unnecessary for describing the present invention will be omitted for clarity, and also like reference numerals in the drawings denote like elements.

1. First Embodiment

[Electrode Assembly According to First Embodiment]

Figure 2:
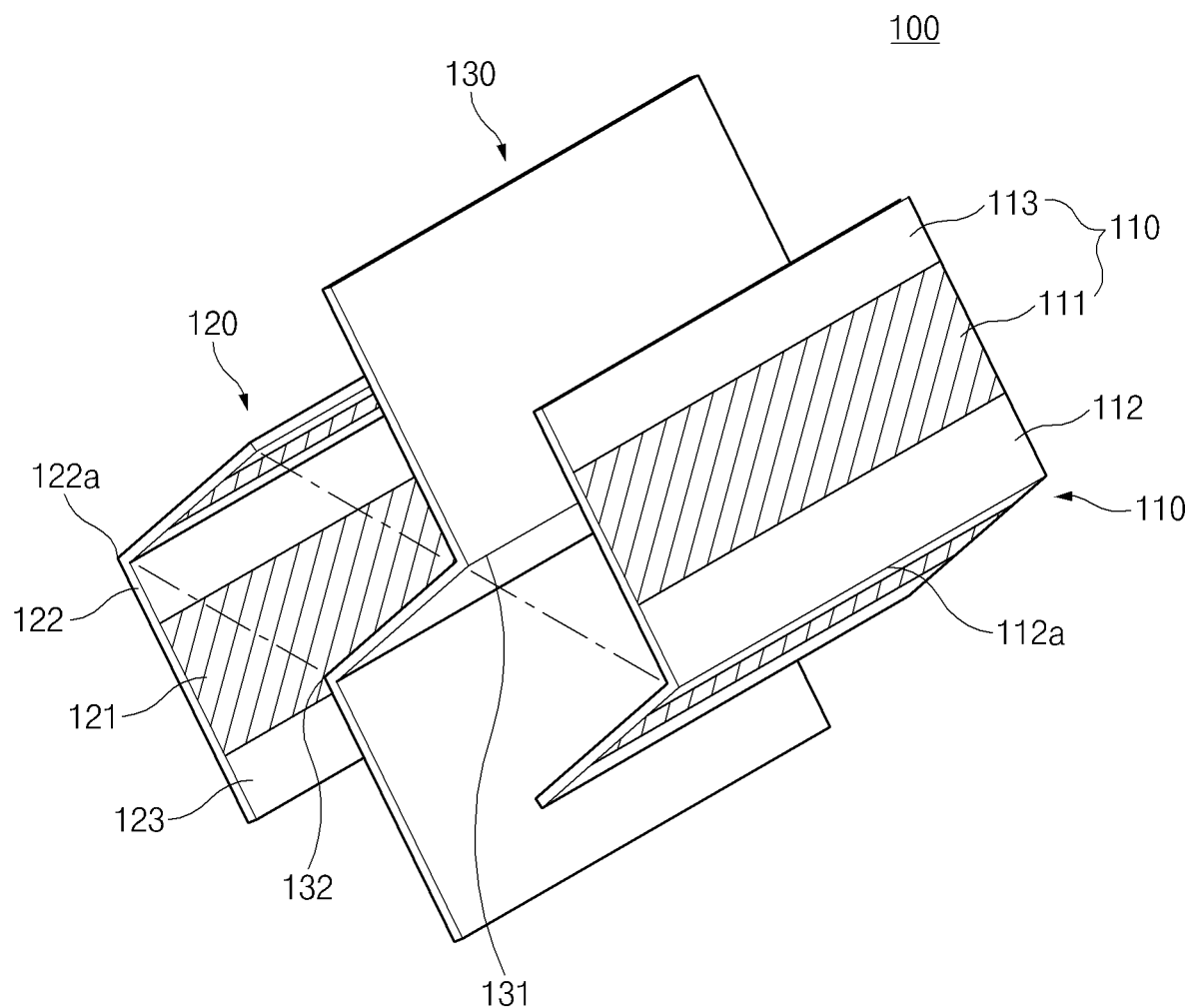
FIG. 2 is a perspective view of the folded radical unit according to the first embodiment of the present invention.
Figure 3:
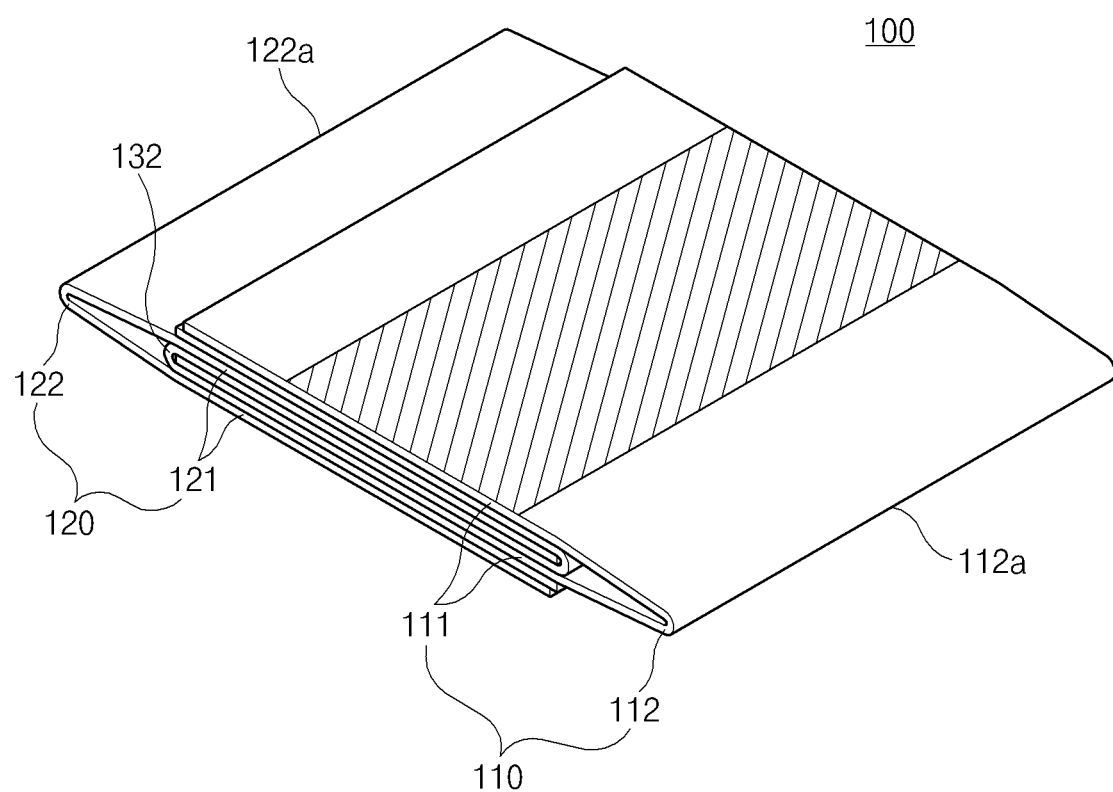
FIG. 3 is a perspective view of a multi-layered radical unit according to the first embodiment of the present invention.

As illustrated in FIGS. 1 to 3, an electrode assembly 10 according to a first embodiment of the present invention comprises a radical unit 100. The radical unit 100 has a structure in which a folded first electrode sheet 110, a folded first separator 130, and a folded second electrode sheet 120 are coupled to each other.

That is, referring to FIGS. 2 and 3, the radical unit 100 comprises the first and second electrode sheets 110 and 120, each of which is folded so that both ends thereof overlap each other, and the first separator 130 folded several times and having an upper folded portion 131 into which the first electrode sheet 110 is coupled to be fitted and a lower folded portion 132 into which the second electrode sheet 120 is coupled to be fitted.

As illustrated in FIG. 1, the first electrode sheet 110 is manufactured by applying a first electrode active material on both surfaces thereof corresponding to top and bottom surfaces of an electrode collector. Then, as illustrated in FIG. 2, the first electrode sheet 110 is folded in half so that the first electrode active materials overlap each other.

That is, the first electrode sheet 110 comprises a first electrode portion 111 disposed on an unfolded portion and coated with the first electrode active material and a first non-coating portion 112 which is disposed on the folded portion and on which the first electrode active material is not provided. The first non-coating portion 112 may be used as an electrode tab after the radical unit 100 is manufactured.

Here, when the folded portion is cut, the first electrode sheet 110 may be divided into two first electrodes comprising the first electrode portion 111 and the first non-coating portion 112.

As illustrated in FIG. 1, the second electrode sheet 120 is manufactured by applying a second electrode active material on both surfaces thereof corresponding to the top and bottom surfaces of the electrode collector. Then, as illustrated in FIG. 2, the second electrode sheet 120 is folded in half so that the second electrode active materials overlap each other.

That is, the second electrode sheet 120 comprises a second electrode portion 121 disposed on an unfolded portion and coated with the second electrode active material and a second non-coating portion 122 which is disposed on a folded portion and on which the second electrode active material is not provided. The second non-coating portion 122 may be used as an electrode tab after the radical unit 100 is manufactured.

Here, when the folded portion is cut, the second electrode sheet 120 may be divided into two second electrodes comprising the second electrode portion 121 and the second non-coating portion 122.

A non-coating surface 113 on which the first electrode active material is not provided is disposed on each of both ends of the folded first electrode sheet 110, and a non-coating surface 123 on which the second electrode active material is not provided is disposed on each of both ends of the second electrode sheet 120. That is, the non-coating surfaces 113 and 123 of the first and second electrode sheets 110 and 120 prevent short-circuit from occurring while the ends of the first and second electrode sheets, which correspond to each other, are bonded to each other.

The first separator 130 is interposed between the first and second electrode sheets 110 and 120 as illustrated in FIG. 1 and is folded in a 'z' shape downward from a top surface thereof.

That is, referring to FIG. 2, the first separator 130 may be folded in the 'z' shape to form an upper folded portion 131 protruding to a right side and a lower folded portion 132 protruding to a left side. The folded first electrode sheet 110 comes into surface contact with the upper folded portion 131, and the folded second electrode sheet 120 comes into surface contact with the lower folded portion 132.

Figure 4:
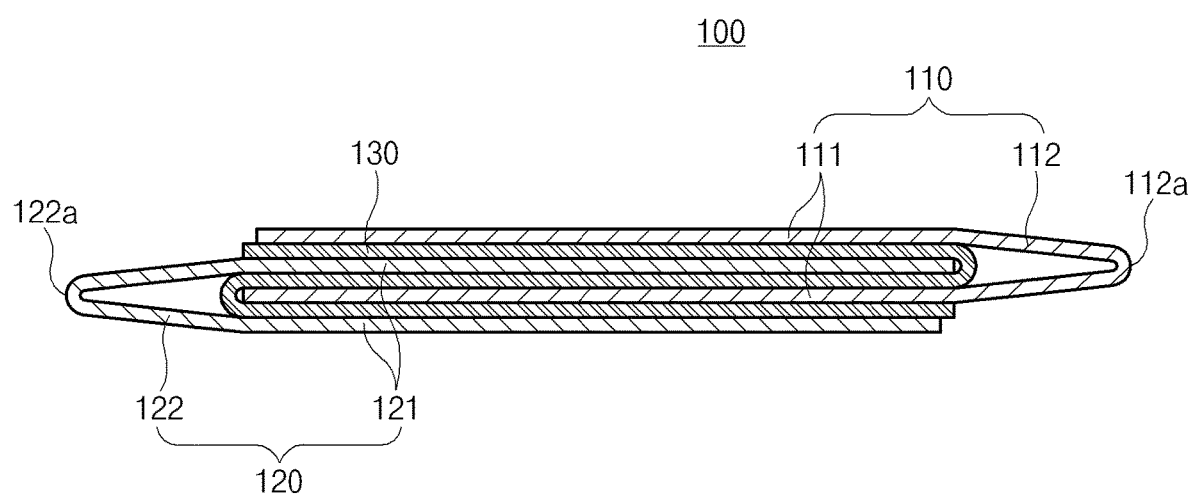
FIG. 4 is a cross-sectional view of FIG. 3.

As illustrated in FIGS. 3 and 4, the radical unit 100 having the above-described structure has a structure in which the first electrode, the first separator, the second electrode, the first separator, the first electrode, the first separator, and the second electrode are successively stacked while the folded first electrode sheet 110, the folded first separator 130, and the folded second electrode sheet 120 are coupled to each other.

Figure 5:
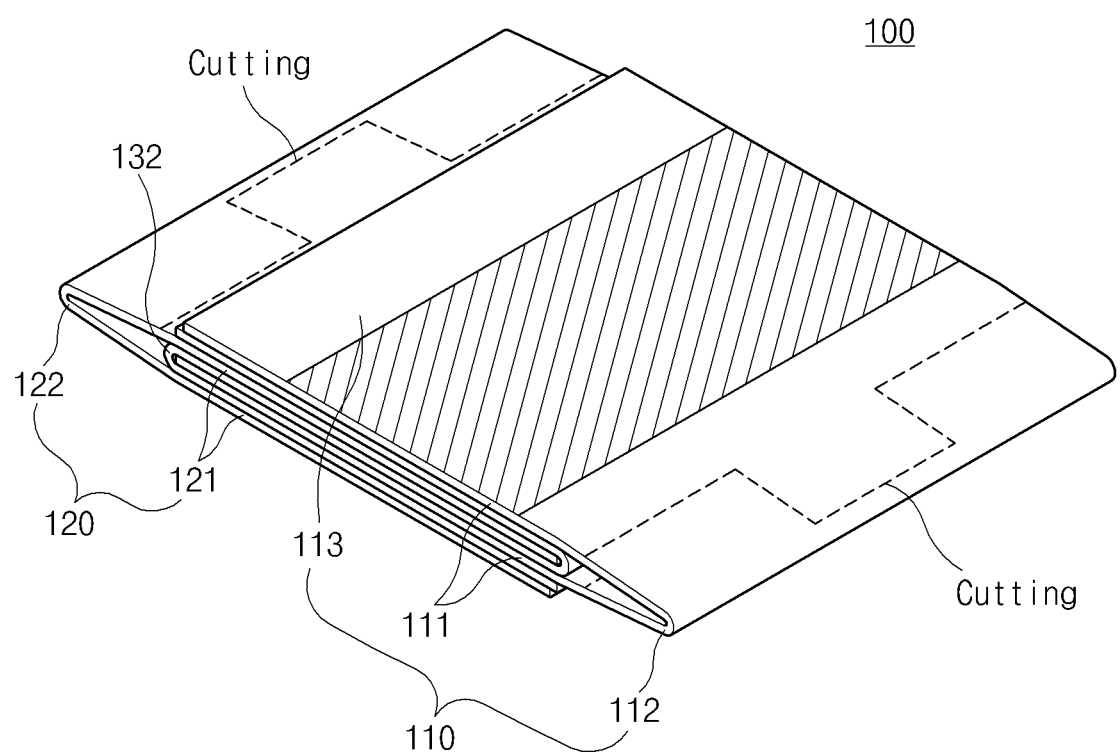
FIG. 5 is a perspective view of the radical unit before cutting is performed to form an electrode tab according to the first embodiment of the present invention.
Figure 6:
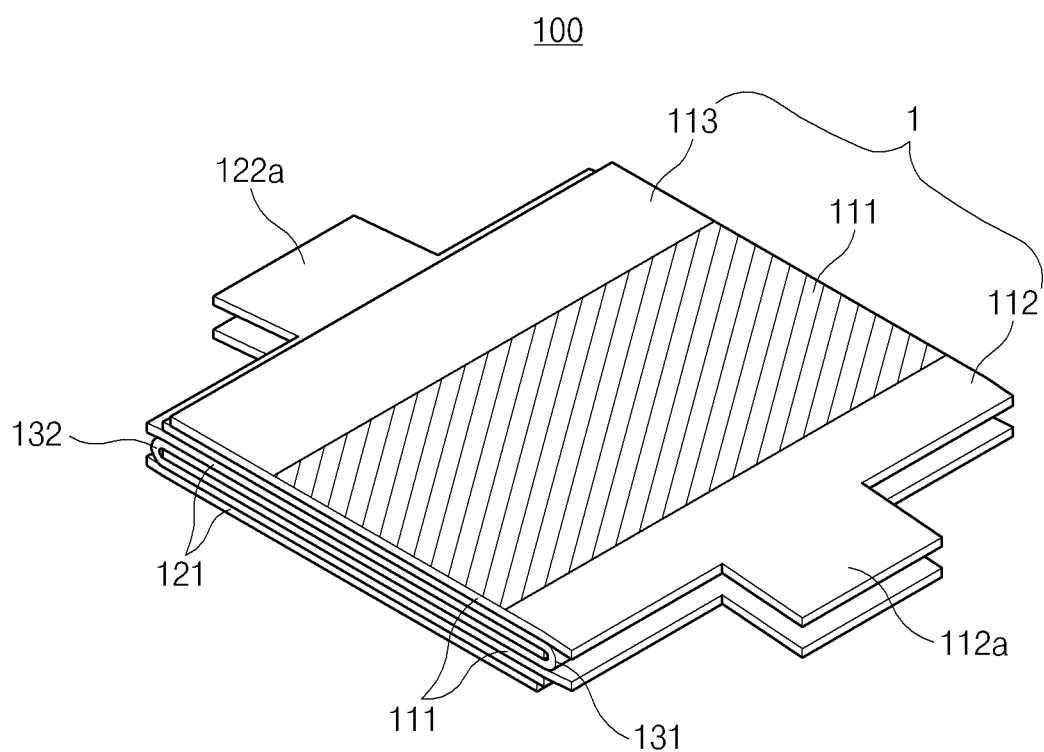
FIG. 6 is a perspective view of the radical unit on which the electrode tab is formed according to the first embodiment of the present invention.

Here, as illustrated in FIGS. 5 and 6, the folded portions (the folded portions of the first and second non-coating portions) of the first and second electrode sheets 110 and 120 are cut to form two first electrodes and two second electrodes, which are completely separated from each other.

Thus, the structure in which the first electrode, the first separator, the second electrode, the first separator, the first electrode, the first separator, and the second electrode are stacked may be provided. That is, a stack type radical unit in which the first electrode, the first separator, and the second electrode are stacked in multi-stages may be realized.

Figure 7:
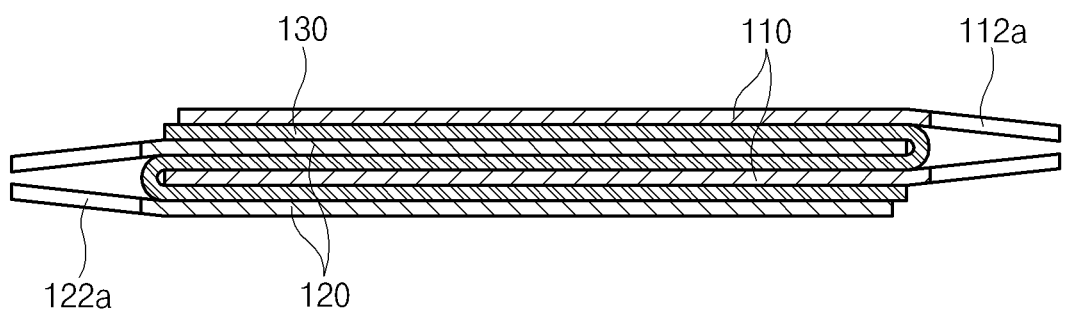
FIG. 7 is a cross-sectional view of FIG. 6.

Referring to FIGS. 5 to 7, in the radical unit 100, the folded portions of the first and second non-coating portions 112 and 122 may extend outward, and the extending portions may be used as first and second electrode tabs 112a and 122a.

Referring to FIGS. 5 to 7, when the folded portions (the folded portions of the first and second non-coating portions) of the first and second electrode sheets 110 and 120 are cut, the folded portions may cut in a sawtooth shape to partially protrude, and the partially protruding portions may be used as the first and second electrode tabs 112a and 112a.

Here, the first and second non-coating portions 112 and 122 may be cut by using laser. Also, the first and second non-coating portions 112 and 122 may cut with uniformly cut surfaces.

The electrode assembly according to the present invention may be prepared by stacking a plurality of radical units 100.

Figure 9:
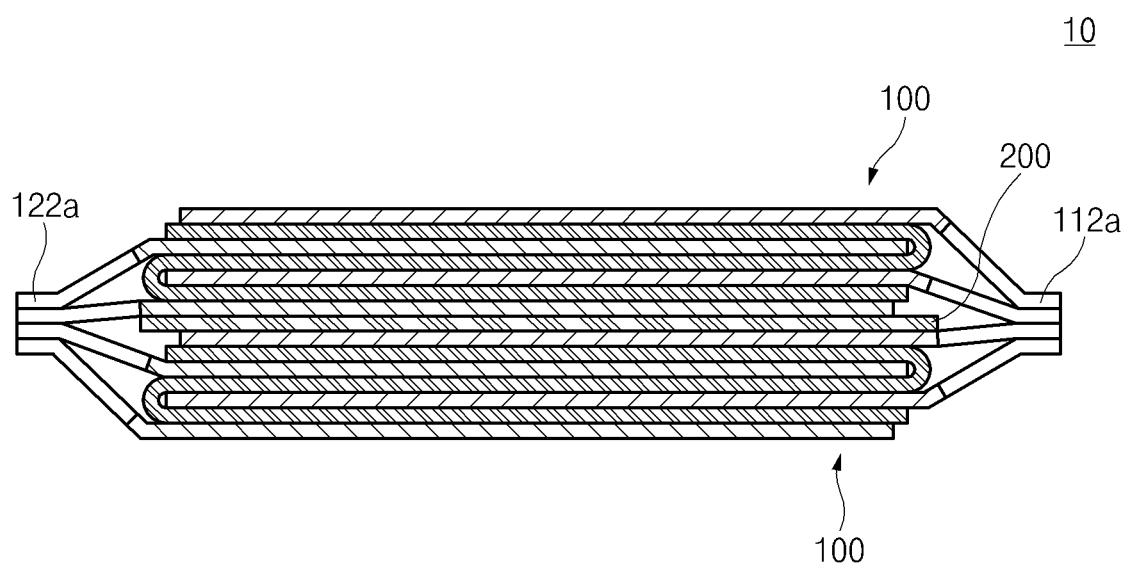
FIG. 9 is a view illustrating a welded state of the electrode tab provided in the electrode assembly according to the first embodiment of the present invention.

That is, as illustrated in FIGS. 7 and 9, the electrode assembly 10 according to the first embodiment of the present invention comprises the radical units 100, which are provided in plurality and stacked in multi-stages, and a second separator 200 interposed between the plurality of radical units 100.

Here, the radical unit 100 may have the same structure and function as the above-described radical unit, and thus, its duplicated description will be omitted.

As described above, the electrode assembly 10 according to the present invention may be realized as the stack type electrode assembly 10 by stacking the plurality of radical units 100 and the second separator 200.

Figure 8:
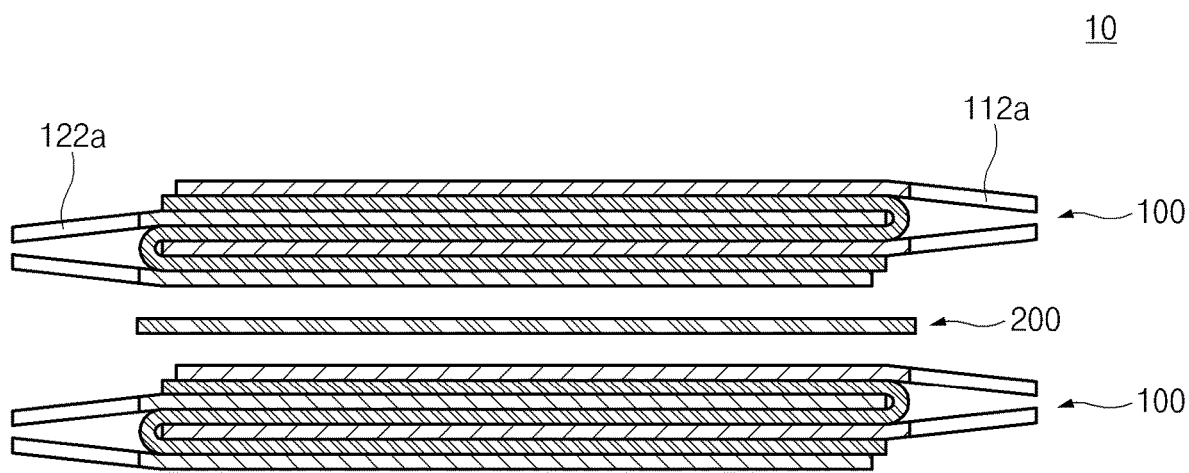
FIG. 8 is a view of an electrode assembly comprising the radical unit according to the first embodiment of the present invention.

As illustrated in FIG. 8, in the plurality of radical units 100, which are stacked in the multi-stages, the first or second electrode tabs 112a or 122a may be disposed on the same side, and the same first or second electrode tabs 112a and 122a may be welded to each other to increase fixing force.

The second separator 200 may have a size greater than that of the radical unit 100. Thus, the radical units 100 disposed to corresponding to each other with respect to the second separator 200 may be prevented from being bonded to each other to prevent the short-circuit from occurring.

Here, a first electrode may be a positive electrode, a second electrode may be a negative electrode, and vice versa.

A method for manufacturing the electrode assembly comprising the above-described constituents will be described below.

[Method for Manufacturing Electrode Assembly According to First Embodiment]

Figure 10:
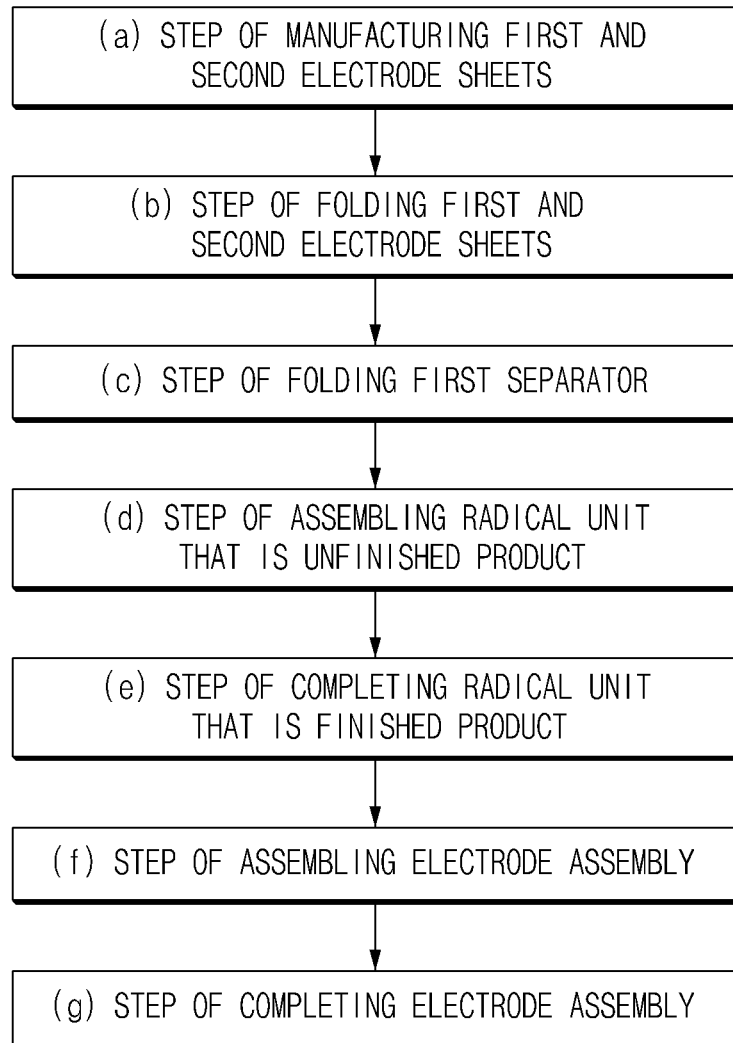
FIG. 10 is a flowchart illustrating a method for manufacturing the electrode assembly according to the first embodiment of the present invention.

As illustrated in FIG. 10, a method for manufacturing the electrode assembly according to the first embodiment comprises a step (a) of manufacturing first and second electrode sheets, a step (b) of folding the first or second electrode sheet manufactured in the step (a), a step (c) of folding a first separator two times, a step (d) of fitting the first and second electrode sheets into the first separator folded in the step (c) to couple the first and second electrode sheets to the first separator, and thereby to assemble a radical unit that is an unfinished product, a step (e) of cutting the first and second non-coating portions of the radical unit that is the unfinished product to form first and second electrode tabs, and thereby to manufacture a radical unit that is a finished product, a step (f) of stacking at least two radical units manufactured in the step (c) in a state in which a second separator is interposed between the radical units to assemble an electrode assembly, and a step (g) of welding the first and second electrode tabs that are exposed in the same later direction of the electrode assembly assembled in the step (f) to manufacture the electrode assembly. Thus, the radical unit in which the first electrode, the first separator, the second electrode, the first separator, the first electrode, the first separator, and the second electrode are successively stacked may be manufactured.

That is, referring to FIG. 1, in the step (a), first or second electrode active material is applied to correspond to both top and bottom surfaces of an electrode collector to manufacture the first or second electrode sheet 110 or 120. In the first or second electrode sheet 110 or 120 manufactured as described above, the first or second non-coating portion 112 or 122 is formed at a central portion, and the first or second electrode portion 111 and 121 is formed on both sides of the first or second non-coating portion 112 or 122. Here, non-coating surfaces 113 and 123, on which the electrode active material is not provided, may be formed on both ends of the first or second electrode sheet 110 or 120.

Referring to FIG. 2, in the step (b), the first or second non-coating portion 112 or 122 is folded so that the first or second electrode portions 111 or 121 applied to both the ends of the first or second electrode sheet 110 or 120 manufactured in the step (a) overlap each other. That is, the first or second electrode sheet 110 or 120 is folded in half.

Referring to FIG. 2, in the step (c), the first separator 130 is folded two times in a 'z' shape. Here, the first separator 130 is folded with the same size to overlap each other. Thus, the first separator 130 comprises an upper folded portion 131 and a lower folded portion 132.

Referring to FIGS. 3 and 4, in the step (d), the folded first electrode sheet 110 is coupled to come into surface contact with the upper folded portion 131 of the first separator 130 that is folded in the step (c), and the folded second electrode sheet 120 is coupled to come into surface contact with the lower folded portion 132. Also, a pressure is applied in the folded direction to assemble the radical unit that is the unfinished product.

In the step (d), the folded first or second non-coating portion 112 or 122 is disposed to extend outward without being coupled to the folded portions 131 and 132 of the first separator 130. That is, the folded first or second non-coating portion 112 or 122 extends outward from the first separator 130, and the extending portion may be used as the electrode tab later.

Referring to FIGS. 5 and 6, in the step (e), the first and second non-coating portions 112 and 122 of the radical unit that is the unfinished product in the step (d) is cut in a sawtooth shape to form the first and second electrode tabs 112a and 122a, thereby completing the radical unit 100.

That is, in the step (e), the folded portion of the first or second non-coating portion 112 and 122 are completely cut in a width direction to be divided into two first electrodes or two second electrodes, thereby completing the radical unit 100 that is the finished product. The protruding portion of the cut first or second non-coating portion 112 or 122 is used as the first or second electrode tab 112a or 122a.

Here, the first and second non-coating portions 112 and 122 may be cut by using laser and thus may cut with uniformly cut surfaces.

The radical unit 100 that is completed as described above has a structure in which the first electrode, the first separator, the second electrode, the first separator, the first electrode, and the first separator, and the second electrode are successively stacked.

Referring to FIG. 8, in the step (f), at least two radical units 100 that are completed in the step (e) are stacked with the second separator 200 therebetween to assemble the electrode assembly 10.

In the step (g), the first and second electrode tabs 112a and 122a exposed in the same lateral direction of the electrode assembly that is assembled in the step (f) are welded to complete the electrode assembly 10 that is the finished product.

Here, the first and second electrode tabs 112a and 122a may be welded by using the laser to improve workability and efficiency.

Thus, the electrode assembly 10 for the secondary battery according to the present invention comprises the radical unit 100, in which the first electrode sheet 110, the first separator 130, and the second electrode sheet 130 may be folded and then coupled to each other, to simplify the structure of the electrode assembly, thereby reducing the work efficiency and costs.

Hereinafter, in description of an electrode assembly according to another embodiment of the present invention, constituents having the same configuration and function have been given with the same reference numeral in the drawings, and thus their duplicated descriptions will be omitted.

2. Second Embodiment

[Electrode Assembly According to Second Embodiment]

Figure 11:
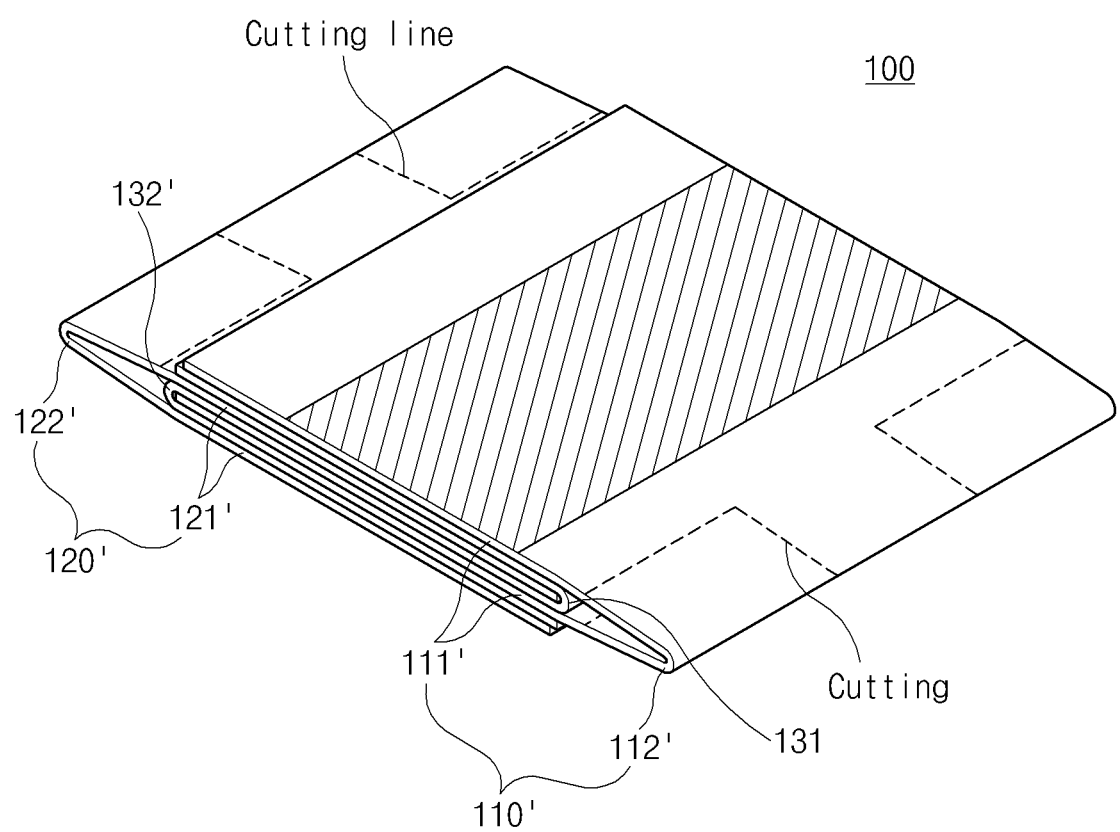
FIG. 11 is a perspective view of a radical unit according to a second embodiment of the present invention.
Figure 12:
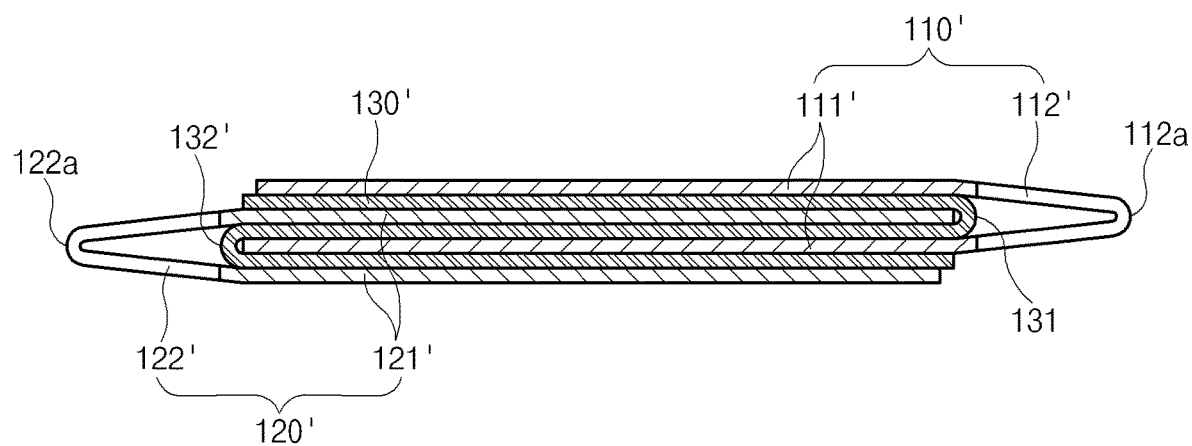
FIG. 12 is a cross-sectional view of FIG. 11.

As illustrated in FIGS. 11 and 12, an electrode assembly 10' according to a second embodiment comprises a radical unit 100'. The radical unit 100' comprises first and second electrode sheets 110' and 120' each of which is folded so that both ends thereof overlap each other and a first separator 130' folded several times and having an upper folded portion 131' coupled to the first electrode sheet 110' and a lower folded portion 132' coupled to the second electrode sheet 120'.

Here, referring to FIG. 11, the radical unit 100' has a structure in which a portion of each of folded portions of the first and second electrode sheets 110' and 120' is cut to form two first electrodes and two second electrodes, of which the portions are connected to each other, and then the first electrode, the first separator, the second electrode, the first separator, the first electrode, the first separator, and the second electrode are successively stacked.

That is, as illustrated in FIG. 11, when both ends of first and second non-coating portions 112' and 122' of the first and second electrode sheets 110' and 120' except for folded central portions are cut, the two first electrodes and the two second electrodes are formed with respect to a center thereof, and the folded portions of the first and second non-coating portions 112' and 122', which are not cut, are used as first and second electrode tabs 112a' and 122a'.

Figure 13:
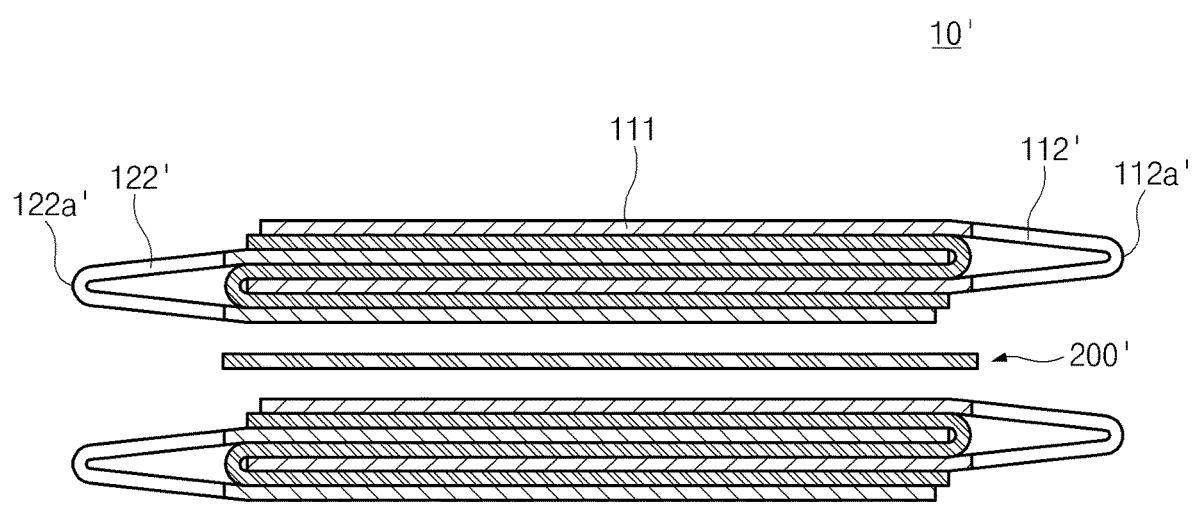
FIG. 13 is a view of an electrode assembly provided in the radical unit of FIG. 12.

As illustrated in FIG. 13, the electrode assembly 10' according to the second embodiment may comprise the radical units 100', which are provided in plurality and stacked in multi-stages, and a second separator 200' interposed between the plurality of radical units 100'.

Figure 14:
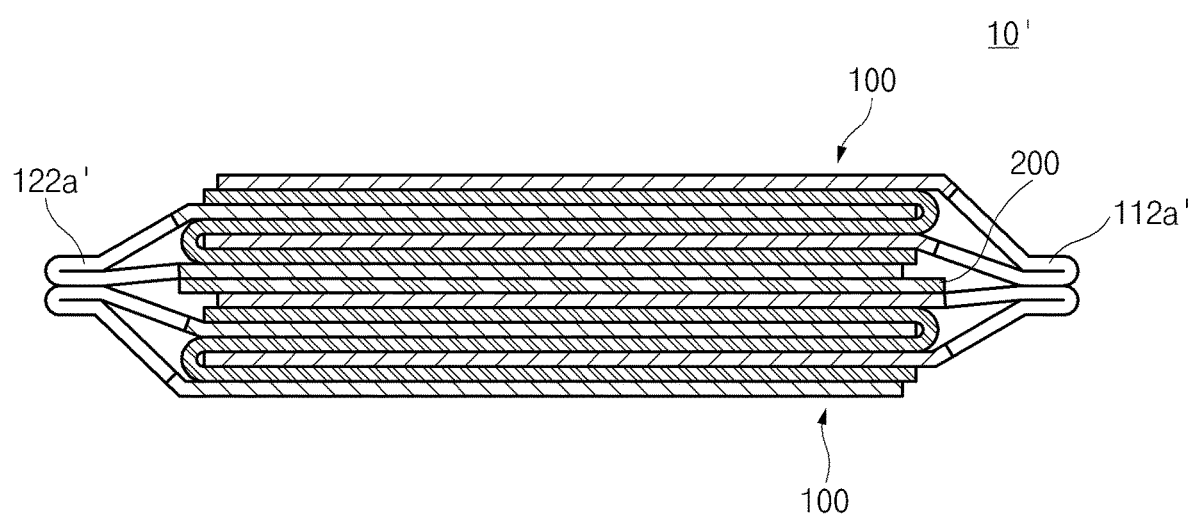
FIG. 14 is a view illustrating a welded state of the electrode tab provided in the electrode assembly according to the second embodiment of the present invention.

Here, as illustrated in FIG. 14, in the electrode assembly 10' according to the second embodiment, the first or second electrode tabs 112a' or 122a' are disposed on the same side in the plurality of radical units 100', which are stacked in multi-stages, and the same first or second electrode tabs 112a' or 122a' are welded to be fixed to each other.

Thus, in the electrode assembly 10' according to the second embodiment, the first and second electrode sheets 110' and 120' may be connected to each other through the first and second electrode tabs 112a' and 122a' to improve workability while the plurality of electrode tabs are welded.

Accordingly, the scope of the present invention is defined by the appended claims rather than the foregoing description and the exemplary embodiments described therein.

Various modifications made within the meaning of an equivalent of the claims of the invention and within the claims are to be regarded to be in the scope of the present invention.

The invention claimed is:

1. An electrode assembly for a secondary battery, which comprises a radical unit comprising first and second electrode sheets each of which is folded so that both ends thereof overlap each other; and a first separator folded several times and having an upper folded portion into which the first electrode sheet is coupled to be fitted and a lower folded portion into which the second electrode sheet is coupled to be fitted,
wherein the first electrode sheet comprises a first electrode portion and a first non-coating portion, the first electrode portion being coated with a first electrode active material, and the first non-coating portion not including the first electrode active material thereon,
wherein the second electrode sheet comprises a second electrode portion and a second non-coating portion, the second electrode portion being coated with a second electrode active material, and the second non-coating portion not including the second electrode active material thereon,
wherein, in the radical unit, the first and second electrode sheets are cut to form two first electrodes and two second electrodes, respectively, which are completely separated from each other, each of the first electrodes having a first electrode tab extending outwardly therefrom along a length dimension, the first electrode tab defined by a cut portion of the first non-coating portion, and each of the second electrodes having a second electrode tab extending outwardly therefrom along the length dimension, the second electrode tab defined by a cut portion of the second non-coating portion, the first and second electrode tabs being narrower in a width dimension than the respective first and second electrodes, the width dimension being orthogonal to the length dimension, and
wherein the first electrode, the first separator, the second electrode, the first separator, the first electrode, the first separator, and the second electrode successively stacked.

2. An electrode assembly for a secondary battery, which comprises a radical unit comprising first and second electrode sheets each of which is folded along a respective first and second seam so that both ends thereof overlap each other; and a first separator folded several times and having an upper folded portion into which the first electrode sheet is coupled to be fitted and a lower folded portion into which the second electrode sheet is coupled to be fitted,
wherein the first electrode sheet comprises a first electrode portion and a first non-coating portion, the first electrode portion being coated with a first electrode active material and not including the first seam, and the first non-coating portion including the first seam and not including the first electrode active material thereon,
wherein the second electrode sheet comprises a second electrode portion and a second non-coating portion, the second electrode portion being coated with a second electrode active material and not including the second seam, and the second non-coating portion including the second seam and not including the second electrode active material thereon,
wherein, in the radical unit, the first non-coating portion of the first electrode sheet is cut to form two first electrodes joined to one another and having a first electrode tab extending outwardly therefrom along a length dimension, the first electrode tab defined by a cut portion of the first non-coating portion, and the second non-coating portion of the second electrode sheet is cut to form two second electrodes joined to one another and having a second electrode tab extending outwardly therefrom along the length dimension, the second electrode tab defined by a cut portion of the second non-coating portion, the first and second electrode tabs being narrower in a width dimension than the respective first and second electrodes, the width dimension being orthogonal to the length dimension, and
wherein the first electrode, the first separator, the second electrode, the first separator, the first electrode, the first separator, and the second electrode are successively stacked.

3. The electrode assembly of claim 1, wherein a non-coating surface on which the first electrode active material is not provided is disposed on a front end of the first electrode portion.

4. The electrode assembly of claim 1, wherein a non-coating surface on which the second electrode active material is not provided is disposed on a front end of the second electrode portion.

5. The electrode assembly of claim 1, wherein the radical unit is provided in plurality, and
a second separator is interposed between the plurality of radical units.

6. The electrode assembly of claim 2, wherein a non-coating surface on which the first electrode active material is not provided is disposed on a front end of the first electrode portion.

7. The electrode assembly of claim 2, wherein a non-coating surface on which the second electrode active material is not provided is disposed on a front end of the second electrode portion.

8. The electrode assembly of claim 2, wherein the radical unit is provided in plurality, and
a second separator is interposed between the plurality of radical units.

* * * * *